(12) United States Patent
Blanco et al.

(10) Patent No.: US 9,626,081 B2
(45) Date of Patent: Apr. 18, 2017

(54) SYSTEM FOR CLASSIFICATION CODE SELECTION

(71) Applicant: The Travelers Indemnity Company, Hartford, CT (US)

(72) Inventors: Monica N. Blanco, Plantsville, CT (US); Hayden Crumrine, Bristol, CT (US); Michael L. Gitberg, Granby, CT (US); Anthony J. Leveillee, Baltimore, MD (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 361 days.

(21) Appl. No.: 14/280,794

(22) Filed: May 19, 2014

(65) Prior Publication Data
US 2015/0331903 A1 Nov. 19, 2015

(51) Int. Cl.
*G06F 17/30* (2006.01)
*G06F 3/0484* (2013.01)

(52) U.S. Cl.
CPC ........ *G06F 3/0484* (2013.01); *G06F 17/3087* (2013.01); *G06F 17/30392* (2013.01); *G06F 17/30873* (2013.01)

(58) Field of Classification Search
CPC ............... G06F 3/0484; G06F 17/3087; G06F 17/30392
USPC ......................................... 707/722, 766, 767
See application file for complete search history.

(56) References Cited

U.S. PATENT DOCUMENTS

| | | | |
|---|---|---|---|
| 6,604,080 B1 | 8/2003 | Kern | |
| 8,626,538 B1 | 1/2014 | Kilpatrick, II et al. | |
| 8,719,063 B1 | 5/2014 | Wade et al. | |
| 2002/0165805 A1* | 11/2002 | Varga | G06Q 30/06 705/28 |
| 2003/0179236 A1 | 9/2003 | Good et al. | |
| 2005/0144114 A1 | 6/2005 | Ruggieri et al. | |
| 2005/0154617 A1 | 7/2005 | Ruggieri et al. | |

(Continued)

OTHER PUBLICATIONS

"The Hartford Introduces Web-Based Quoting and Submission Tool for Small Commercial Insurance" URL: http://hig.client.shareholder.com/releasedetail.cfm?releaseid=209383 retrieved from the Internet: Oct. 20, 2014. 2 pages.

(Continued)

*Primary Examiner* — Phong Nguyen
(74) *Attorney, Agent, or Firm* — Cantor Colburn LLP

(57) ABSTRACT

A system for classification code selection is provided. In some embodiments, the system receives a geographic location indicator associated with a plurality of geographic location-based rules stored in a database. The system monitors a user input interface of an interactive user display for a user input string that includes a minimum number of characters. A suggestion request may be generated to retrieve a data set from the database that matches the geographic location indicator and the user input string based on determining that the user input string includes at least the minimum number of characters. The data set received in response to the suggestion request may be formatted as a list including one or more entries, where each of the entries has a numeric classification code and a corresponding description. The list may be output on the interactive user display for selection and further processing.

32 Claims, 15 Drawing Sheets

(56) References Cited

U.S. PATENT DOCUMENTS

| | | | |
|---|---|---|---|
| 2008/0140616 A1* | 6/2008 | Encina | G06F 17/30864 |
| | | | 707/E17.014 |
| 2009/0228301 A1 | 9/2009 | Youngblood et al. | |
| 2009/0300046 A1* | 12/2009 | Abouyounes | G06F 17/30265 |
| | | | 707/E17.009 |
| 2010/0094666 A1 | 4/2010 | Pendergrass et al. | |
| 2010/0169365 A1* | 7/2010 | Chupp | G06F 17/30637 |
| | | | 707/769 |
| 2011/0077977 A1 | 3/2011 | Collins et al. | |
| 2011/0161182 A1* | 6/2011 | Racco | G06Q 30/0277 |
| | | | 705/14.73 |
| 2012/0158289 A1* | 6/2012 | Bernheim Brush | G01C 21/3484 |
| | | | 701/425 |
| 2014/0067737 A1* | 3/2014 | Kapadia | G06N 5/025 |
| | | | 706/20 |
| 2014/0207789 A1* | 7/2014 | Lee | G06F 17/3087 |
| | | | 707/741 |
| 2014/0244309 A1 | 8/2014 | Francois | |
| 2014/0330594 A1 | 11/2014 | Roberts et al. | |
| 2016/0125024 A1 | 5/2016 | Blanco et al. | |
| 2016/0125025 A1 | 5/2016 | Blanco et al. | |
| 2016/0125422 A1 | 5/2016 | Blanco et al. | |

OTHER PUBLICATIONS

Insurance Requirements & Regulations by State; Advanced Insurance Management LLC "AIM"; Jun. 11, 2005, 35 pages.

U.S. Appl. No. 14/527,964 Non-Final Office Action dated Jan. 20, 2017, 62 pages.

U.S. Appl. No. 14/528,006 Non-Final Office Action dated Jan. 11, 2017, 27 pages.

* cited by examiner

FIG. 3A

| | 302 | 304 | 306 | 308 | 310 | 312 | 314 | 316 |
|---|---|---|---|---|---|---|---|---|
| 300 → | TABLE ID | CLASS CODE | VERSION | LOCATION CODE | INDUSTRY CODE | EFFECTIVE DATE | EXPIRATION DATE | DESCRIPTION |
| 318 → | 465 | 8017 | 1.2 | CT | 45 | OCT-1-2014 | DEC-31-2015 | AUCTIONEERS |
| | ... | | | | | | | |
| | 678 | 8017 | 2.3 | WA | 76 | JAN-1-2012 | MAR-31-2016 | COFFEE DEALER - RETAIL |

| | 302 | 304 | 306 | 308 | 310 | 312 | 314 | 354 | 356 | 316 |
|---|---|---|---|---|---|---|---|---|---|---|
| 350 → | TABLE ID | CLASS CODE | VERSION | LOCATION CODE | INDUSTRY CODE | EFFECTIVE DATE | EXPIRATION DATE | SIC CODE | NAIC CODE | DESCRIPTION |
| 318 → | 465 | 8017 | 1.2 | CT | 45 | OCT-1-2014 | DEC-31-2015 | 7389 | 561990 | AUCTIONEERS |

320, 352

Class Codes

| State | Loc # | Class Code | Description | Premium Basis | # Employees Full Time | # Employees Part Time | Federal Cvg | Vol Comp |
|---|---|---|---|---|---|---|---|---|
| MO | 001 | 9082 | RESTAURANT NOC | 200,000 | 5 | 0 | No | No |
| MO | 002 | 9082 | RESTAURANT NOC | 200,000 | 5 | 0 | No | No |
| MO | 003 | 9082 | RESTAURANT NOC | 200,000 | 5 | 0 | No | No |

[+] Add New Class    [✎] Edit/View    [⊗] Delete Class

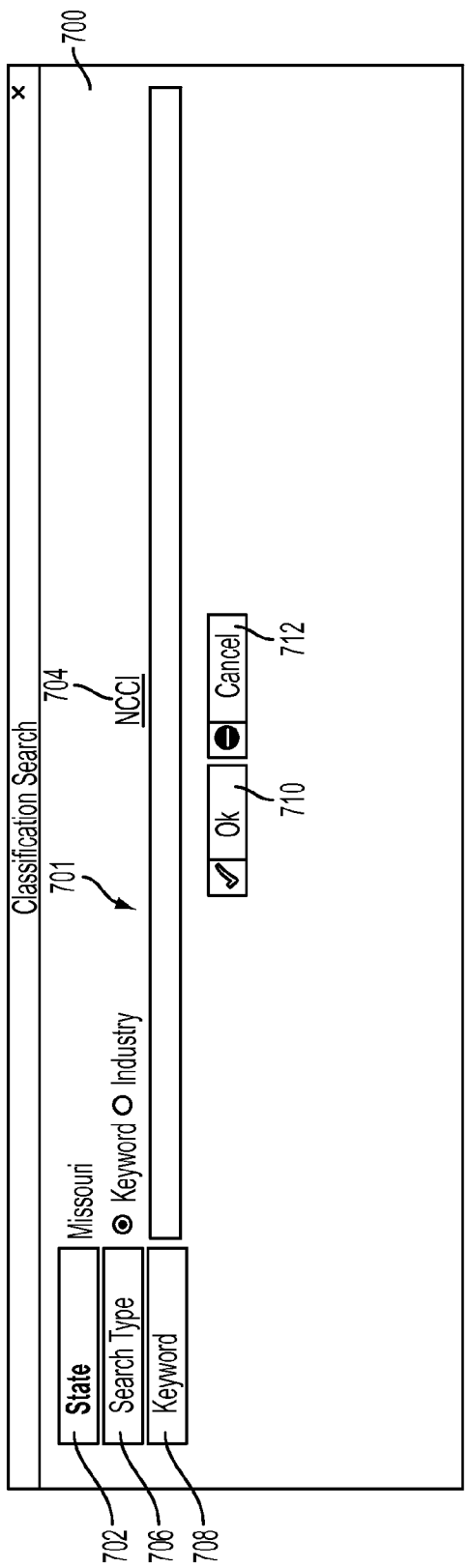

Classification Search

State: Missouri

Search Type: ○ Keyword  ● Industry

Keyword: Retail Trade or

Keyword: _____

[Get all Class Codes]

Class Code: _____  NCCI

9519 AIR CONDITIONING SYSTEMS-PORTABLE UNITS-INSTALLATION, SERVICE OR REPAIR & D
8017 ALE DEALER-RETAIL
8017 AUCTIONEERS
8748 AUTOMOBILE LEASING COMPANY- LONG-TERM: SALESPERSONS
8046 AUTOMOBILE PARTS AND ACCESSORIES NOC & D
8046 AUTOMOBILE RECYCLING: STORE EMPLOYEES
8748 AUTOMOBILE SALESPERSONS
8018 BARBER OR BEAUTY PARLOR OR SUPPLY HOUSE
8102 BEAN SORTING OR HANDLING
8017 BEER DEALER-RETAIL
8017 BEER OR ALE DEALER-RETAIL
8010 BICYCLES: RETAIL SALE OR RENTAL
8058 BUILDING MATERIAL DEALER-NEW MATERIALS ONLY: STORE EMPLOYEES
8232 BUILDING MATERIAL DEALER-NEW MATERIALS ONLY: ALL OTHER EMPLOYEES & YARD, WAREHOUSE, DRIVERS
9110 CHARITABLE OR WELFARE ORGANIZATION: ALL OTHER EMPLOYEES & D
9110 CHARITABLE ORGANIZATION: ALL OTHER EMPLOYEES & D
8006 COFFEE DEALER-RETAIL
5192 COFFEE SERVICE COMPANIES-ALL OPERATIONS-& S, D
8006 COFFEE, TEA OR GROCERY DEALER- RETAIL
5192 COIN OPERATED MACHINES- INSTALLATION, SERVICE OR REPAIR-& S, D
8031 COLD STORAGE LOCKER-FROZEN FOODS
8232 CONCRETE READY MIX DEALER & YARD EMPLOYEES, DRIVERS

FIG. 10

SYSTEM FOR CLASSIFICATION CODE SELECTION

BACKGROUND

In industries such as banking, finance, and insurance, proper classification of data is critical to comply with a number of regulations that can vary based on geographic location, and may be further complicated by the assignment of different classification codes for similar data depending upon geographic location. For example, in the insurance industry, workers compensation classification codes can be three or four digits as assigned by the National Council on Compensation Insurance (NCCI) or state rating bureaus. In the context of workers compensation insurance, over 700 unique classification codes exist, which serve as the basis for pricing and underwriting of workers compensation insurance policies. The classification codes help to differentiate between the various job duties or "scope of work performed" by employees.

Classification codes that are regulated by industry and geographic location are subject to change as time passes. Regulating bodies need not coordinate updates relative to each other, leading to any number of changes at any time throughout the year. The highly regulated yet dynamic nature of classification codes can make it challenging for professionals to stay current on exact numeric codes and associated definitions. This can result in a time consuming process of frequently researching, locating, and identifying proper classification codes using a number of industry sites and/or publications. As one example, when creating a new insurance policy, an insurance professional can seek out and manually input the proper classification codes when entering various attributes that describe risks and/or operations of the policy applicant. For policies that span many job types and geographic locations, the risk of error or misclassification increases where outdated classification codes can be used and free-form manual data entry is performed.

When manual searches of various data sources are performed to determine classification codes, knowledge of contents and formatting of the data sources may be required. For example, when searching for a classification code by its associated description, a keyword search may be performed to identify the associated description. However, the keyword search may be ineffective if the user does not know exactly how the description is worded, and thus may fail to accurately locate the correct classification code. Different descriptions can be assigned to the same classification code for different geographic locations. Moreover, a single classification code can be assigned to multiple descriptions for the same geographic location. Accordingly, several attempts may be needed to craft a search string that aligns with varying description definitions and formats in the data sources. This variability can result in additional time needed to populate forms that use classification codes, as searches may be reformatted and repeated across various data sources to capture one or more desired classification codes.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 3A depicts a class code table according to some embodiments of the present invention;

FIG. 3B depicts another example of a class code table according to some embodiments of the present invention;

FIG. 5 depicts another example of an interactive user display and user input interface according to some embodiments of the present invention;

FIG. 6 depicts another example of an interactive user display and user input interface according to some embodiments of the present invention;

FIG. 7A depicts another example of an interactive user display and user input interface according to some embodiments of the present invention;

FIG. 7B depicts another example of an interactive user display and user input interface according to some embodiments of the present invention;

FIG. 10 depicts another example of an interactive user display and user input interface according to some embodiments of the present invention;

DETAILED DESCRIPTION

According to an embodiment, a system for classification code selection (e.g., class code wizard) is provided as part of a data entry and analysis system. The system may be used in gathering data from multiple sources as part of a data classification and selection process. As one example, the class code wizard can be used as part of an insurance rate/quote/issue system that gathers policy information, performs underwriting and eligibility analysis, collects geographic location data, determines one or more associated classification codes, and generates a quotation for an insurance policy. In some insurance product lines, common guidelines are required for all insurers providing coverage. For instance, state-specific guidelines for underwriting workers compensation insurance are promulgated so that each insurer provides common coverage. In workers compensation insurance, a complex classification scheme is typically used that classifies workers based on scope of work performed to define appropriate policy pricing and benefits. For companies that operate in numerous geographic locations that cross state lines and employ different types of workers, the process of accurately classifying all of the workers in all of the locations can be cumbersome.

In an exemplary embodiment, a class code wizard is provided that simplifies a classification process by integrating numerous geographic location-based rules with a search interface which supports rapid look-up operations based on user input of a minimum number of characters to identify potential exact matches and synonym matches. The classification process can be used for insurance quotation generation, financial systems, legal services, banking services, medical record management, shipping classification, economic data classification, or any such application where geographic location-based rules are linked to classification codes. For example, in an application analyzing economic data, different countries or regions may use separate industrial classification systems with different but similar coding systems, such as the North American Industry Classification System, the United Kingdom Standard Industrial Classification of Economic Activities, Australian and New Zealand Standard Industrial Classification, and the like. Accordingly, although a detailed example is described herein in reference to a workers compensation class code wizard, the class code wizard may be generally applicable to any number of industry or governmental systems beyond insurance.

Figure 1:
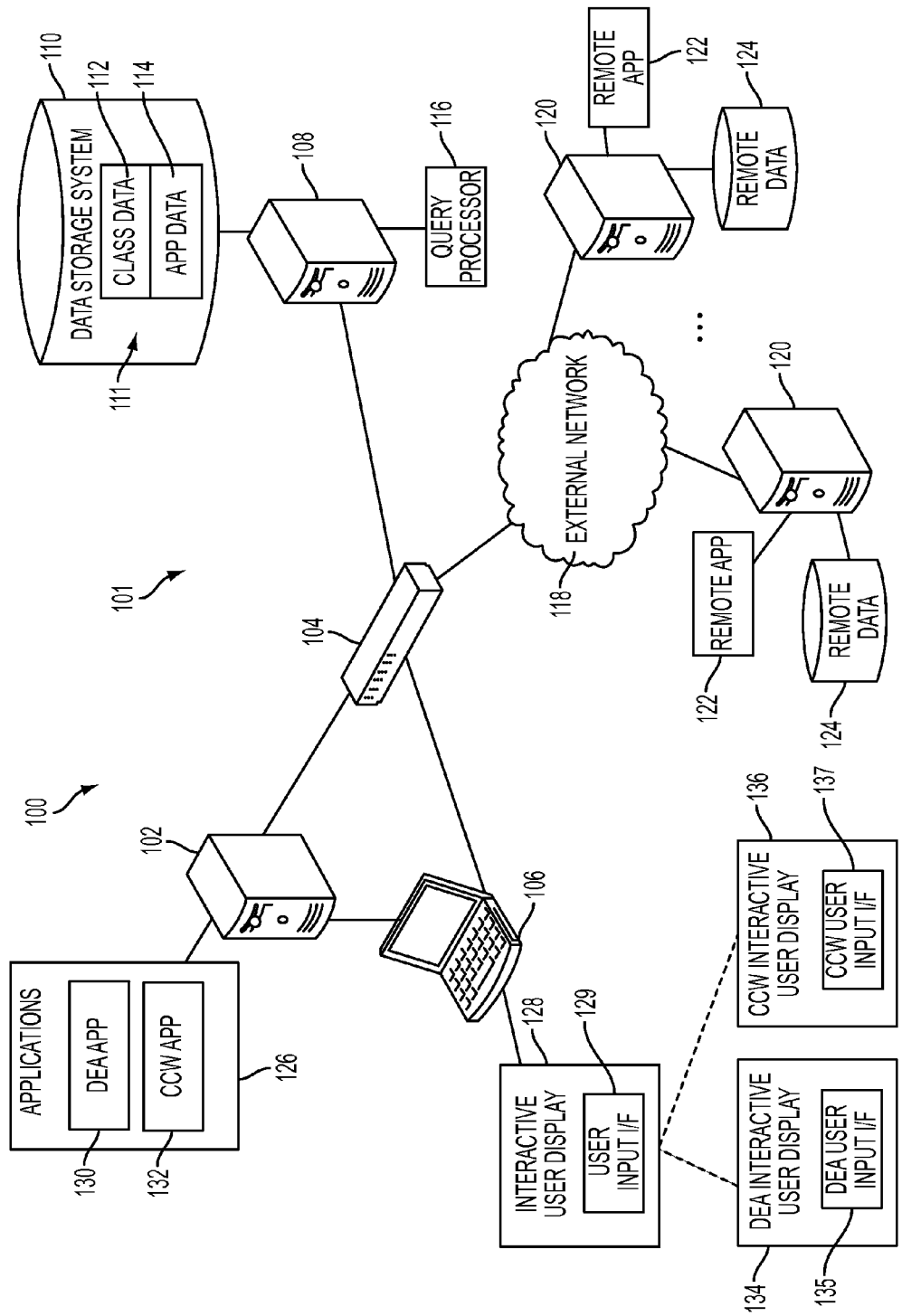
FIG. 1 depicts a block diagram of a system according to some embodiments of the present invention.

Turning now to FIG. 1, a system 100 is depicted upon which an interactive classification code selection process may be implemented. The system 100 includes a data entry and analysis system 101 which may include an application server 102 coupled to a mediation layer gateway 104. A user system 106 can be coupled to the application server 102 and the mediation layer gateway 104. The mediation layer gateway 104 is also coupled to a query server 108 that accesses and indexes data in a data storage system 110. The data storage system 110 can hold a database 111 that may include a variety of data, such as classification data 112, application data 114, as well as other data (not depicted). In an exemplary embodiment, the classification data 112 can include data organized in one or more tables of records that may be selected as part of the interactive classification code selection process. The application data 114 may include other data values to support an application program that uses the interactive classification code selection process. For example, in an insurance quotation application, the classification data 112 may include mandated classification codes and associated data from a regulating authority, while the application data 114 can include applicant information, pricing models, underwriting guidelines, and the like. A query processor 116 may execute on the query server 108 to retrieve selected records from the database 111 based on a query from the application server 102, the user system 106, or other system.

The data entry and analysis system 101 may access an external network 118 via the mediation layer gateway 104 and/or one or more other firewalls or gateways (not depicted). One or more remote servers 120 can be accessed through the external network 118. Each remote server 120 can include one or more remote applications 122 and remote data 124. The external network 118 can be a large-scale, global network, such as the Internet. The remote data 124 may be accessed by the user system 106, for instance, via a hyperlink. The remote data 124 can also be used to update data in the database 111. In one embodiment, the classification data 112 is updated by the data entry and analysis system 101 making requests to access the remote data 124 and reformatting the remote data 124 as needed to store in the classification data 112. In an alternate embodiment, one of the remote applications 122 with proper authentication can push updates from the remote data 124 to the classification data 112 and mark the data as updated.

The application server 102 can source a number of application programs 126 that may be executed by the application server 102, the user system 106, or in a distributed manner between the application server 102, the user system 106 and/or other systems. The user system 106 includes an interactive user display 128 to display information and a user input interface 129 that collects inputs from a user. The interactive user display 128 can be generated by one or more of the applications 126 on the application server 102 and provides information and input options for the user input interface 129. For example, the interactive user display 128 can appear as a data entry template where the user input interface 129 includes user modifiable fields to enter data values or make selections.

The mediation layer gateway 104 can provide an enterprise service bus (ESB) that routes various communications and supports a number of protocols within the system 100. For example, the mediation layer gateway 104 may process Simple Object Access Protocol (SOAP) requests and responses relative to the application server 102, Representational State Transfer (REST) requests and responses using Asynchronous JavaScript™ and extensible markup language (XML) (AJAX) relative to the user system 106, Hypertext Transfer Protocol (HTTP) query requests and responses relative to the query server 108, and any number of known protocols relative to the external network 118. A number of other protocols can be used throughout the system 100. For instance, the application server 102 and user system 106 may support JavaServer™ Faces (JSF)/Facelet requests and responses, and the query server 108 may access the data storage system 110 using Open Database Connectivity (ODBC).

In the example of FIG. 1, each of the application server 102, the mediation layer gateway 104, the user system 106, the query server 108, the data storage system 110, and the remote servers 120 can include a processor (e.g., a processing device such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the data entry and analysis system 101 executes computer instructions for implementing the exemplary processes described herein. Instructions that implement various process steps can be executed by different elements of the data entry and analysis system 101. For example, user input on the user system 106 can result in a request for data as a query that is processed by the query server 108. User inputs can also result in requests to the application server 102 which may also result in another request for data as a query processed by the query server 108. Although depicted separately, one or more of the application server 102, the mediation layer gateway 104, the user system 106, the query server 108, and the data storage system 110 can be combined or further subdivided. In an embodiment, the data entry and analysis system 101 is implemented by an insurance company.

In some embodiments, the application server 102 may include one or more electronic and/or computerized controller devices such as computer servers communicatively coupled to interface with the user system 106 (e.g., one or more client computers) and/or third-party devices (directly and/or indirectly). According to some embodiments, the application server 102 may be located remote from the user system 106. The application server 102 may also or alternatively include a plurality of electronic processing devices located at one or more various sites and/or locations. In an exemplary embodiment, the application server 102 is a JBoss™ application server.

According to some embodiments, the application server 102 and/or the user system 106 may store and/or execute specially programmed instructions to operate in accordance with one or more embodiments described in this disclosure. The application server 102 and/or the user system 106 may, for example, execute one or more programs that perform geographic location-based classification data selection.

The user system 106 may be implemented using a general-purpose computer executing one or more computer programs for carrying out processes described herein. In one embodiment, the user system 106 may be a personal computer (e.g., a laptop, desktop, etc.), a network server-attached terminal (e.g., a thin client operating within an internal network of the application server 102), or a portable device (e.g., a tablet computer, personal digital assistant, smart phone, etc.). In an embodiment, the user system 106 is operated by an insurance professional, such as a product manager, broker, or agent of an insurance company. It will be understood that while only a single user system 106 is shown in FIG. 1, there may be multiple user systems 106 communicatively coupled to the application server 102 and mediation layer gateway 104.

Various networks may be used to establish communication within the system 100, such as a wide area network (WAN), a local area network (LAN), a global network (e.g., Internet), a virtual private network (VPN), and an intranet. Communication within the system 100 may be implemented using a wireless network or any kind of physical network implementation known in the art.

Information stored in the data storage system 110 may be retrieved and manipulated via the query server 108, based on requests from the application server 102 or the user system 106, for example. The data storage system 110 may be implemented using a variety of devices for storing electronic information. It is understood that the data storage system 110 may be implemented using memory contained in the query server 108 or it may be a separate physical system, as shown in FIG. 1. It will be understood that multiple storage devices may be employed in the data storage system 110. For example, the storage devices of the data storage system 110 may be dispersed across the system 100, and each of the storage devices may be logically addressable as a consolidated data source across a distributed environment. In an embodiment, the data storage system 110 may include one or more third-party data devices. According to some embodiments, data may be stored by or provided via one or more optional third-party data devices of system 100. A third-party data device may comprise, for example, an external hard drive or flash drive connected to the system 100, a remote third-party computer system for storing and serving data (e.g., claim data, business data, state insurance data) for use in performing one or more functions described in this disclosure, or a combination of such remote and/or local data devices. In one embodiment, one or more companies and/or end users may subscribe to or otherwise purchase data (e.g., demographic, financial, employment, claim, or other data) from a third party and receive the data via the third-party data device.

Each of the application server 102, the mediation layer gateway 104, the user system 106, the query server 108, the data storage system 110, and the remote servers 120 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

The applications 126 of application server 102 can include multiple application programs or sequences of instructions to implement processes as described herein. For example, a data entry and analysis (DEA) application 130 may include a sequence of executable instructions that enable a user to enter relevant information, access associated application data 114, perform analysis tasks such as determining eligibility, initiate a classification process, and provide results and reports. Although depicted as a single block in FIG. 1, the DEA application 130 can include a collection of modules, routines, functions, scripts, and the like to implement a data entry and analysis process. A class code wizard (CCW) application 132 may also be provided to ensure that a correct classification code is selected upon which other data values depend. The CCW application 132 can interface with the query processor 116 to perform lookup and reporting of the classification data 112 in combination with the DEA application 130. The query processor 116 may provide rapid feedback to the CCW application 132 by maintaining a number of indexes into the classification data 112, which may include synonym definitions to support matching on similar terms when a search is initiated. The query processor 116 or another process on the query server 108 may include an automated process that periodically updates and indexes the database 111. The query processor 116 can also support wildcard searches based on partial string matching to exact terms or similar terms based on synonym definitions. Although depicted separately, the DEA application 130 and the CCW application 132 can be combined to form a single application in the applications 126.

According to the design pattern of the interactive user display 128 and user input interface 129, the user system 106 can include one or more instances of a DEA interactive user display 134 with a DEA user input interface 135 that interacts with the DEA application 130. The DEA interactive user display 134 may define one or more form templates to be populated with data obtained through the application server 102 and/or the query server 108 as a Web browser-based or stand-alone application implementation. The DEA interactive user display 134 and DEA user input interface 135 may include a sequence of display screens and user interfaces to be presented at different points during progression of the process. For example, different interactive interface views can be produced to enter specific data items, respond to questions, and output results.

Also according to the design pattern of the interactive user display 128 and user input interface 129, a CCW interactive user display 136 and CCW user input interface 137 can be defined separately or be included as part of the DEA interactive user display 134 and DEA user input interface 135. The CCW interactive user display 136 and CCW user input interface 137 interacts with the CCW application 132 according to one or more form templates populated with user data and data obtained through the application server 102 and/or the query server 108 as a Web browser-based or stand-alone application implementation. Depending upon a search type performed, the CCW interactive user display 136 may present different classification code selection options that can be selected using the CCW user input interface 137.

One example of a general sequence of interactions that can be initiated by a user in the system 100 begins with user input received on the user input interface 129 (which may be the DEA user input interface 135 or CCW user input interface 137), for instance, from a keyboard and/or mouse/pointer device. When a request, such as a search request, is received at the user system 106, the search request may be forwarded to the mediation layer gateway 104 using an AJAX interface as a REST-based request. In response, the mediation layer gateway 104 can generate a query request for the query server 108 as an HTTP query request. The query processor 116 performs a query process to find potential matches to the query request in the data storage system 110 and a response may be provided as an HTTP query response from the query server 108 to the mediation layer gateway 104. Subsequently, the mediation layer gateway 104 can make the query response available to be obtained by an AJAX interface as a REST-based response for the user system 106. With regard to the application server 102, a request from a client can be obtained, such as a facelet request obtained by the application server 102 from the user system 106. The request can be sent from the application server 102 to the mediation layer gateway 104 as a SOAP-based request using a JAX-web service. Again, the mediation layer gateway 104 can use an HTTP query request and an HTTP query response in communicating with the query server 108. A response can be obtained from the mediation layer gateway 104 by the application server 102 as a SOAP-based response using a JAX-web service. The application server 102 can provide the facelet response to the user system 106.

Figure 2:
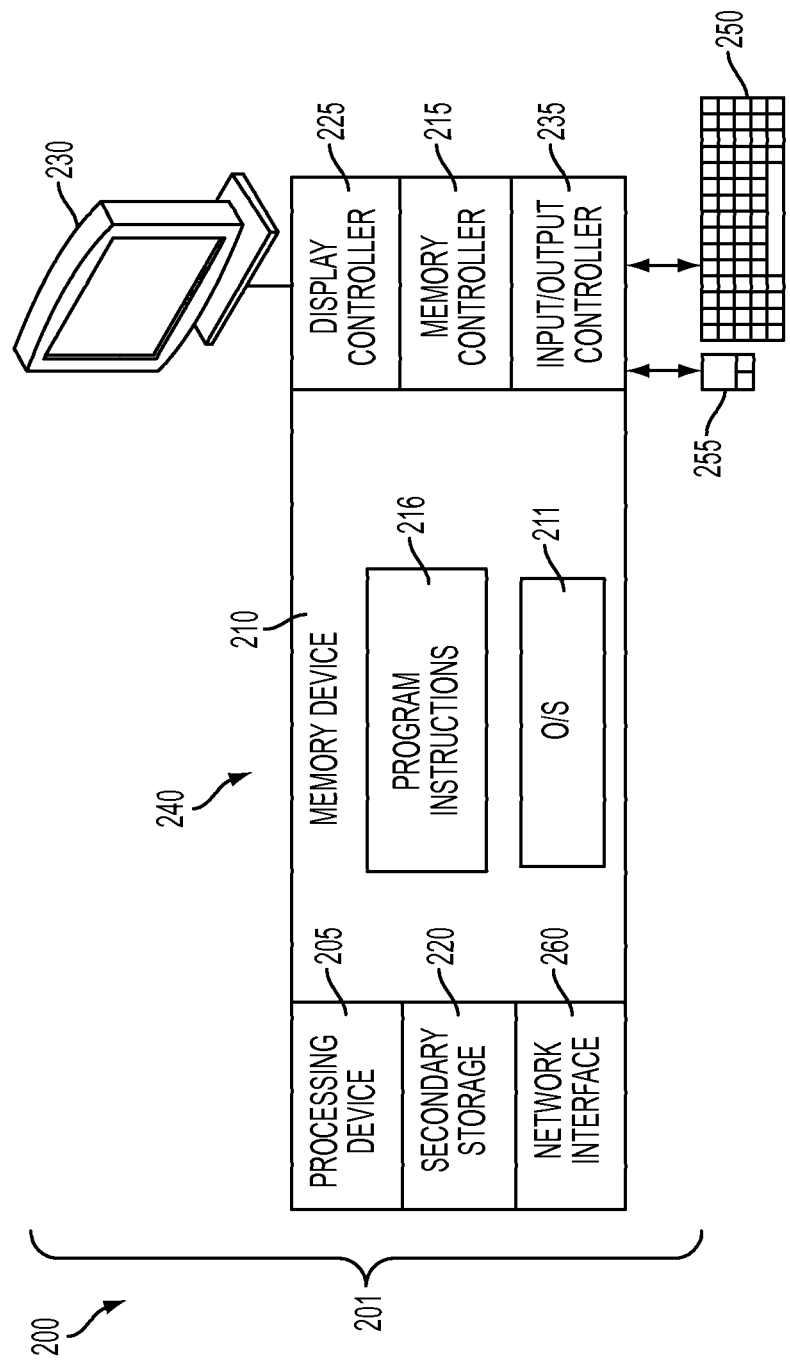
FIG. 2 depicts a block diagram of a system according to some embodiments of the present invention.

FIG. 2 depicts a block diagram of a system 200 according to an embodiment. The system 200 is depicted embodied in a general-purpose computer 201 in FIG. 2. The system 200 is an example of the user system 106 of FIG. 1. The application server 102, the mediation layer gateway 104, the query server 108, and the remote servers 120 of FIG. 1 can also include similar computer elements as depicted in the computer 201 of FIG. 2.

In an exemplary embodiment, in terms of hardware architecture, as shown in FIG. 2, the computer 201 includes a processing device 205 and a memory device 210 coupled to a memory controller 215 and an input/output controller 235. The input/output controller 235 can be, for example, but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a conventional keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 is a hardware device for executing software, particularly software stored in secondary storage 220 or memory device 210. The processing device 205 can be any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remote from one another, but can be accessed by the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the DEA interactive user display 134, the DEA user input interface 135, the CCW interactive user display 136, and/or the CCW user input interface 137 of FIG. 1, where the system 200 is an embodiment of the user system 106 of FIG. 1. Further examples of the program instructions 216 can include instructions to implement the DEA application 130 and CCW application 132 of FIG. 1, the query processor 116 of FIG. 1, and the remote applications 122 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in the user system 106 of FIG. 1, the network interface 260 can establish communication channels with the application server 102 and the mediation layer gateway 104 of FIG. 1.

Turning now to FIG. 3A, an example of a class code table 300 is depicted as may be included in the classification data 112 of FIG. 1. The class code table 300 represents a collection of data values that can be searched, for instance, based on a query request from the CCW application 132 via the CCW user input interface 137 of FIG. 1. The class code table 300 may be manually populated based on published data sources or extracted from the remote data 124 of FIG. 1. In the example of FIG. 3A, the class code table 300 is formatted for workers compensation insurance job code classification and includes a table identifier 302, a class code 304, a version number 306, a location code 308, an industry code 310, an effective date 312, an expiration date 314, and a description 316. The table identifier 302 may serve as an index to a particular entry or row 318 in the class code table 300. The class code 304 can be a numerical code as defined by a regulating body, such as the National Council on Compensation Insurance (NCCI) or state rating bureaus. Values of the class code 304 are defined as separate codes that differentiate between various job duties or "scope of work performed" by workers. The version number 306 may indicate a class code definition version that defines a mapping between the class code 304 and associated wording in the description 316 for the geographic location identified in the location code 308.

The location code 308 can be a text field, such as a two-digit state code or a numeric code used to map to a location code formatted with any number of characters. For example, the location code 308 could be formatted to include a value of "CT" for the state of Connecticut or a number that serves as an index to a separate table (not depicted), e.g., numeric code "07" mapping to "Connecticut". The industry code 310 can be an industry group code that aligns with definitions generated by the National Association of Insurance Commissioners (NAIC), for example. The class codes 304 are effective on specific dates and expire on a specific date as defined by the effective date 312 and expiration date 314 respectively. The description 316 may be defined by the NCCI or state rating bureau that generated the class code 304. Specific wording of each description 316 can vary for similar class codes 304 depending upon the location code 308, as various state rating bureaus associated with different locations can generate different wording for the description 316. The combination of the class code 304, version number 306, location code 308, industry code 310, effective date 312, expiration date 314, and description 316 may be collectively referred to as geographic location-based rules 320 for quoting and issuing insurance policies.

FIG. 3B depicts another example of a class code table 350, as may be included in the classification data 112 of FIG. 1. Similar to the class code table 300 of FIG. 3A, each entry or row 318 in the class code table 350 may include a table identifier 302, a class code 304, a version number 306, a location code 308, an industry code 310, an effective date 312, an expiration date 314, and a description 316. The class code table 350 may also include other code data 352 associated with the location code 308 and the class code 304. In the example of FIG. 3B, the other code data 352 includes a standard industry classification (SIC) code 354 and a NAIC code 356. Therefore, in the context of FIG. 3B, geographic location-based rules 320 include the combination of the class code 304, version number 306, location code 308, industry code 310, effective date 312, expiration date 314, description 316, SIC code 354, and NAIC code 356. Additional or fewer codes can be included in the other code data 352. The inclusion of the other code data 352 can enable a more robust range of search options when performing class code searches. For instance, if the SIC code 354 is known or the NAIC code 356 is known, but the class code 304 and/or corresponding wording of the description 316 are unknown, a SIC-code search or a NAIC-code search can be used to locate the desired data. The particular order of data in the class code table 350 is merely one example and other arrangements are also contemplated in other embodiments.

Figure 3C:
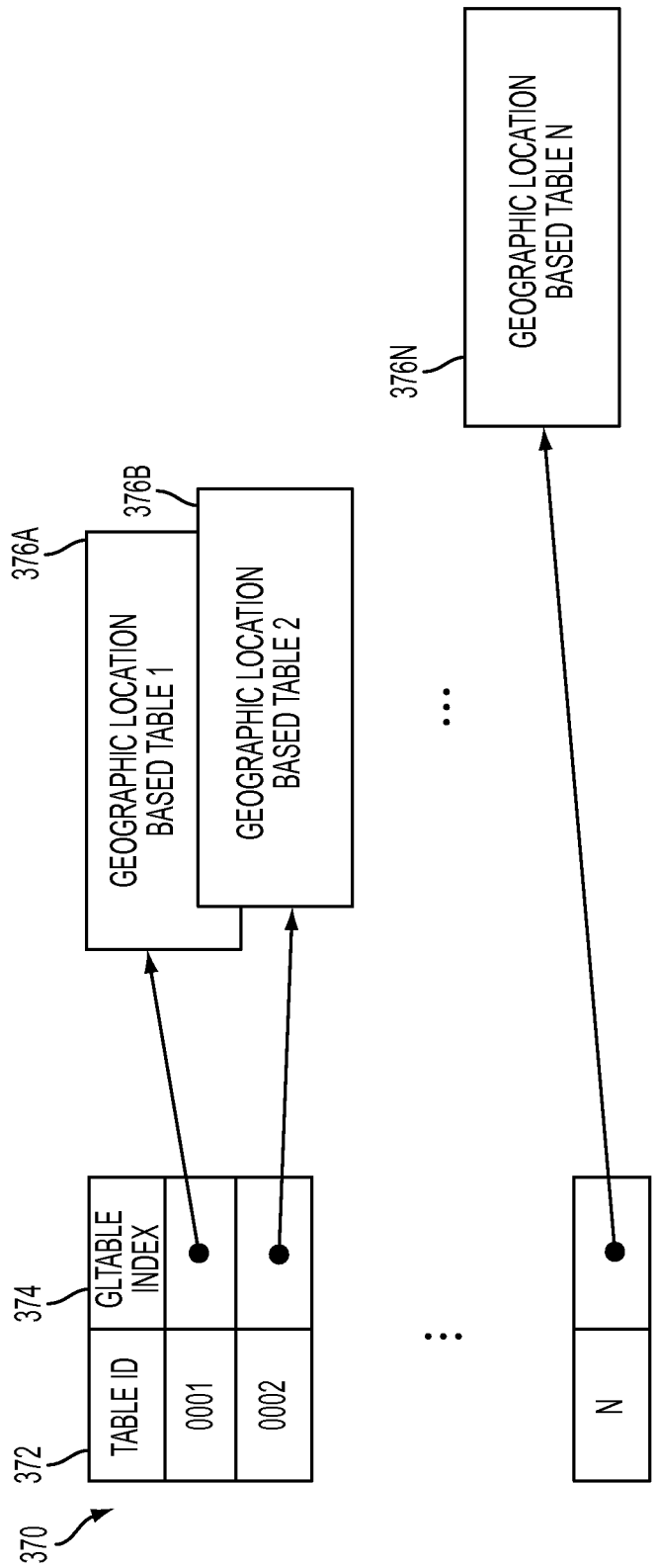
FIG. 3C depicts a data structure according to some embodiments of the present invention.

FIG. 3C depicts an alternate embodiment in which the contents of the class code table 300 of FIG. 3A or the contents of the class code table 350 of FIG. 3B are distributed between multiple tables. In this example, an index table 370 includes table identifiers 372 and geographic location table index values 374. The table identifiers 372 may be equivalent to the table identifiers 302 of FIG. 3A or 3B. The geographic location table index values 374 can point to a plurality of geographic location based tables 376A, 376B, . . . , 376N that each have a common location code, such as the location code 308 of FIG. 3A or 3B. Each of the geographic location based tables 376A-376N can include the same or substantially similar fields as described in reference to FIGS. 3A and 3B that form the geographic location-based rules 320 of FIGS. 3A and 3B, such as a class code, version number, industry code, effective date, expiration date, description, and/or other code data. The arrangement of information as depicted in FIG. 3C may ease update burdens and simplify data uploads from various sources (e.g., remote data 124 of FIG. 1) that provide data specific to each geographic location. For example, the geographic location based table 376A can include specific data for the state of Alabama, while the geographic location based table 376B can include specific data for the state of Alaska. Additional metadata may also be defined for each of the geographic location based tables 376A-376N, for instance, to define when each table was last updated, the source of the update, and the like.

Figure 4:
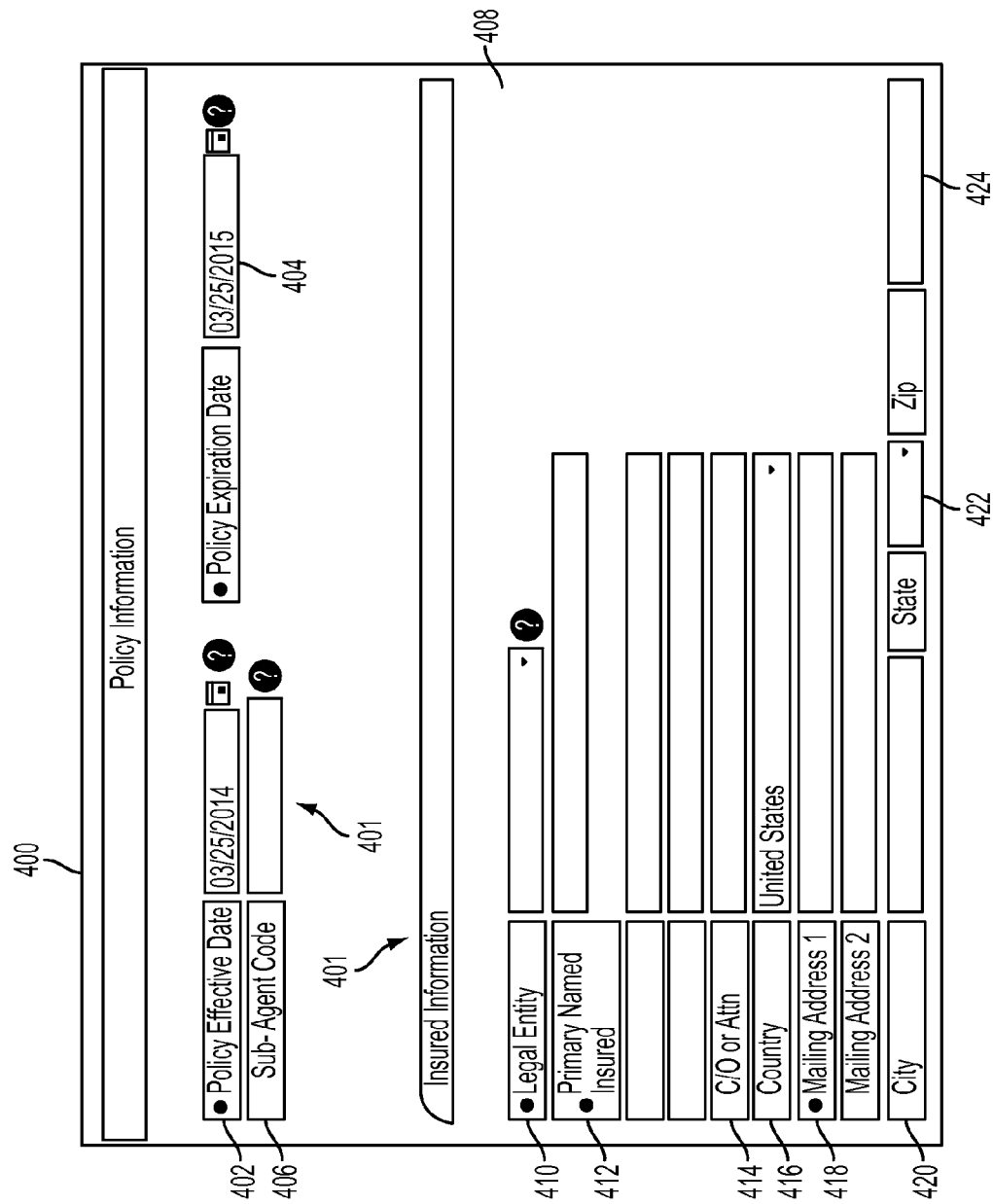
FIG. 4 depicts an interactive user display and user input interface according to some embodiments of the present invention.

FIG. 4 depicts an example of an interactive user display 400 and user input interface 401 to populate information related to an insurance policy, for instance, as one instance of the DEA interactive user display 134 and DEA user input interface 135 of FIG. 1. The interactive user display 400 can prompt a user to enter a number of values related to an insurance policy, where the user input interface 401 defines a data entry interface for collecting information such as an effective date 402, an expiration date 404, a sub-agent code 406, and insured information 408. The effective date 402 and/or the expiration date 404 can be used as part of a record selection process relative to the effective date 312 and the expiration date 314 of FIGS. 3A and 3B. The sub-agent code 406 can identify an agent or sub-agent responsible for an associated insurance policy. The insured information 408 may include a legal entity 410, a primary named insured 412, a "care of" or "attention" identifier 414, a country 416, a mailing address 418 (e.g., street address), a city 420, a state 422, and a ZIP code 424. Numerous other data items can also be collected using a series of fields or questions. The city 420, state 422, and/or ZIP code 424 are examples of geographic locations that can impact the selection of data as constrained by the geographic location-based rules 320 of FIGS. 3A and 3B. For example, the state 422 may map to the location code 308 of FIGS. 3A and 3B. In order to prepare an insurance policy, a number of additional data values must be collected and accurately classified.

FIG. 5 depicts an example of an interactive user display 500 and user input interface 501 to add and edit uses of classification codes, for instance, as one instance of the DEA interactive user display 134 and DEA user input interface 135 of FIG. 1. The interactive user display 500 may be a classification code interface operable to create a plurality of classification records in preparation of an insurance policy as previously described in reference to FIG. 4. It will be understood that numerous other instances or versions of the DEA interactive user display 134 and DEA user input interface 135 can be defined for the DEA application 130 of FIG. 1. In the example of FIG. 5, a user can populate a number of fields related to generating a quote for workers compensation insurance for a restaurant with multiple locations. Example fields include a geographic location 502, a location number 504, a numeric classification code 506, a corresponding description 508 associated with the numeric classification code 506, a premium basis 510, a number of full time employees 512, a number of part time employees 514, a federal coverage field 516, and a voluntary compensation field 518. The geographic location 502 may be defined at a state or other regulatory jurisdiction level for workers compensation insurance coverage, while the location number 506 can be used to enumerate each separate place of business. The numeric classification code 506 and a corresponding description 508 are defined according to the NCCI or state rating bureau of the geographic location 502. The federal coverage field 516 can indicate whether the employees at a particular location defined by the geographic location 502 and location number 504 qualify for coverage under the U.S. Longshore and Harbor (USL&H) Workers Compensation Act, for example. The voluntary compensation field 518 may be used to indicate whether additional insurance coverage is desired beyond the minimum requirements to comply with various workers compensation insurance laws and regulations.

Figure 6:
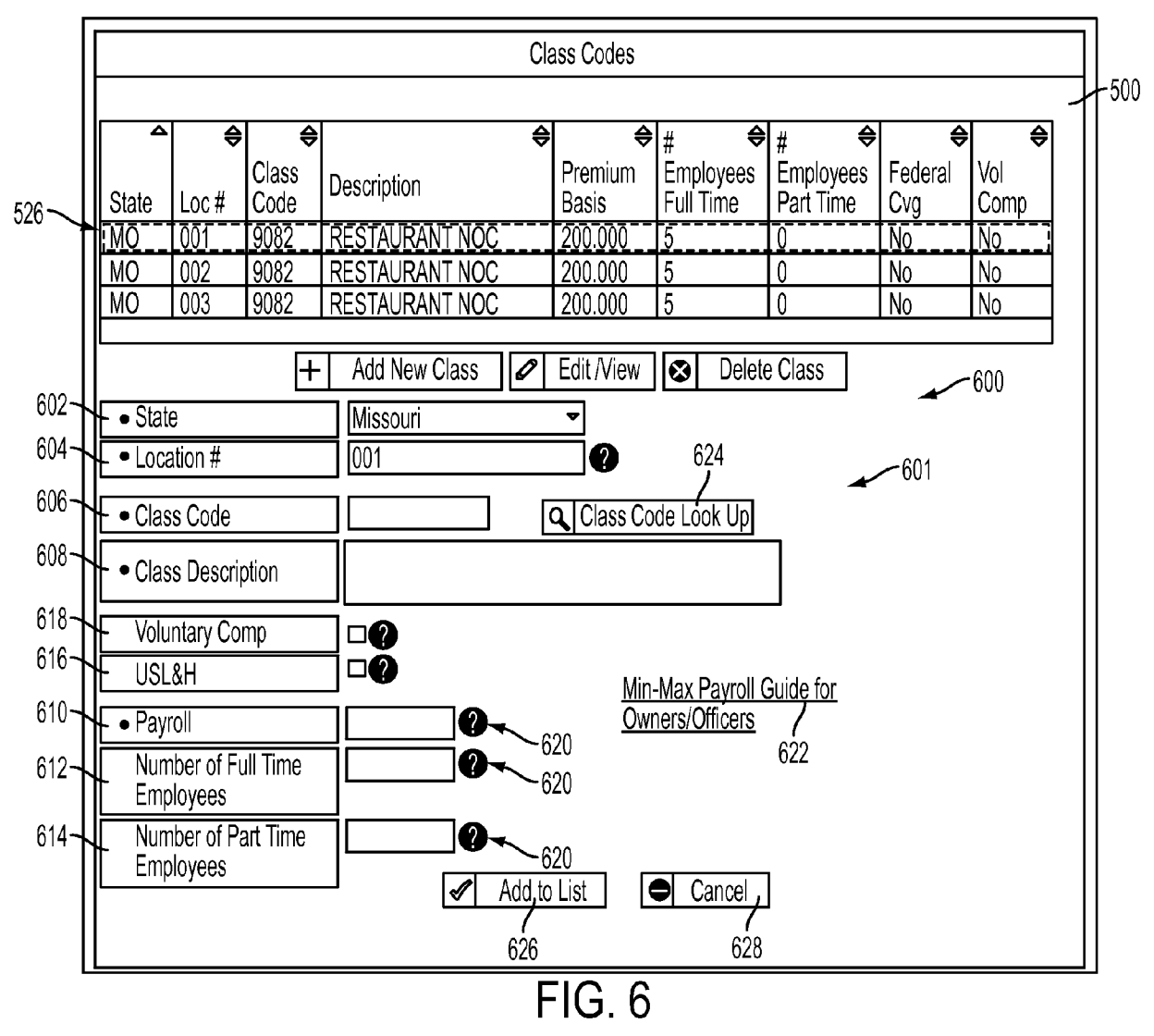

The user input may be received on the user input interface 501 to add a new class 520, to edit or view 522, or to delete a class 524. A user selection can highlight a particular classification record 526 to edit or view 522. In the example of FIG. 5, the first classification record 526 is selected for editing. An editor portion 600 of the interactive user display 500 may appear upon the selection of edit or view 522, as depicted in FIG. 6. Examples of the types of data that can be viewed, input, or updated in a user input interface 601 of the editor portion 600 of the interactive user display 500 include modifiable versions of the fields 502-518 of FIG. 5 including a geographic location 602, a location number 604, a numeric classification code 606, a description 608, a payroll 610, a number of full time employees 612, a number of part time employees 614, a federal (e.g., USL&H) coverage field 616, and a voluntary compensation field 618. Modification of some fields may be constrained by various rules. For example, the geographic location 602 can be constrained as a pull-down input to select a valid option from a list. The geographic location 602 presented in the editor portion 600 may be displayed in a longer format, while the geographic location 502 of FIG. 5 may represent an abbreviated format of the same information. The location number 604 may be constrained to avoid conflicts with other values of the location number 504 of FIG. 5 that have already been defined. The numeric classification code 606 and description 608 are also constrained such that they align with geographic location-based rules associated with the geographic location 502. The payroll 610 may be constrained by various minimum and maximum payroll rules, where the payroll 610 is used in defining the premium basis 510 of FIG. 5.

A number of assistance tools 620 and hyperlinks 622 may be defined to assist in understanding how to populate each of the fields 602-618. In an exemplary embodiment, a class code look up 624 can trigger the CCW application 132 of FIG. 1 to assist in populating the numeric classification code 606 and description 608 according to geographic location-based rules, such as geographic location-based rules 320 of FIGS. 3A and 3B, associated with the geographic location 602. An Add-to-List button 626 may be selected by a user to save any updates to data in fields 602-618, while a Cancel button 628 can prevent any changes to data in the fields 602-618 from being saved.

FIG. 7A depicts an example of an interactive user display 700 and user input interface 701 for classification searching as an example of the CCW interactive user display 136 and CCW user input interface 137 of FIG. 1. The interactive user display 700 may be displayed on a user system 106 of FIG. 1 based on a selection of the class code look up 624 of FIG. 6. The interactive user display 700 may include a geographic location indicator 702 as a static value received based on the geographic location 602 of FIG. 6. The interactive user display 700 can also include a hyperlink 704 to a remote data source, such as remote data 124 of FIG. 1, to provide additional information associated with numeric classification codes and corresponding descriptions for the geographic location indicator 702. The user input interface 701 can include a search type selection field 706, a keyword input field 708, as well as an Ok button 710, and a Cancel button 712. The search type selection field 706 may provide two or more options for a search type to be performed, such as a keyword search or an industry search. Additional search options can be added to further narrow the results.

As a further example, FIG. 7B depicts an example of an interactive user display 750 and user input interface 751 for classification searching as an example of the CCW interactive user display 136 and CCW user input interface 137 of FIG. 1. The interactive user display 750 may be displayed on a user system 106 of FIG. 1 based on a selection of the class code look up 624 of FIG. 6. Similar to the interactive user display 700 of FIG. 7A, the interactive user display 750 may include a geographic location indicator 702 as a static value received based on the geographic location 602 of FIG. 6. The user input interface 751 can also include a search type selection field 752 and keyword input field 708, where the search type selection field 752 is an expanded version of the search type selection field 706 of FIG. 7A and may be aligned with a different data source. For instance, options depicted in the search type selection field 706 of FIG. 7A may align with the class code table 300 of FIG. 3A while options depicted in the search type selection field 752 of FIG. 7B may align with the class code table 350 of FIG. 3B.

In addition to keyword-based searches and industry-based searches, the example of FIG. 7B supports other code search types 754 to search other code data beyond description and industry data. Examples of other code search types 754 include a SIC code search 756, a NAIC code search 758, and a class code search 760. For instance, upon selecting the SIC code search 756, data entered at the keyword input field 708 can be searched against the SIC code 354 of FIG. 3B. Similarly, upon selecting the NAIC code search 758, data entered at the keyword input field 708 can be searched against the NAIC code 356 of FIG. 3B. Upon selecting the class code search 760, data entered at the keyword input field 708 can be searched against the class code 304 of FIGS. 3A and 3B.

Figure 8A:
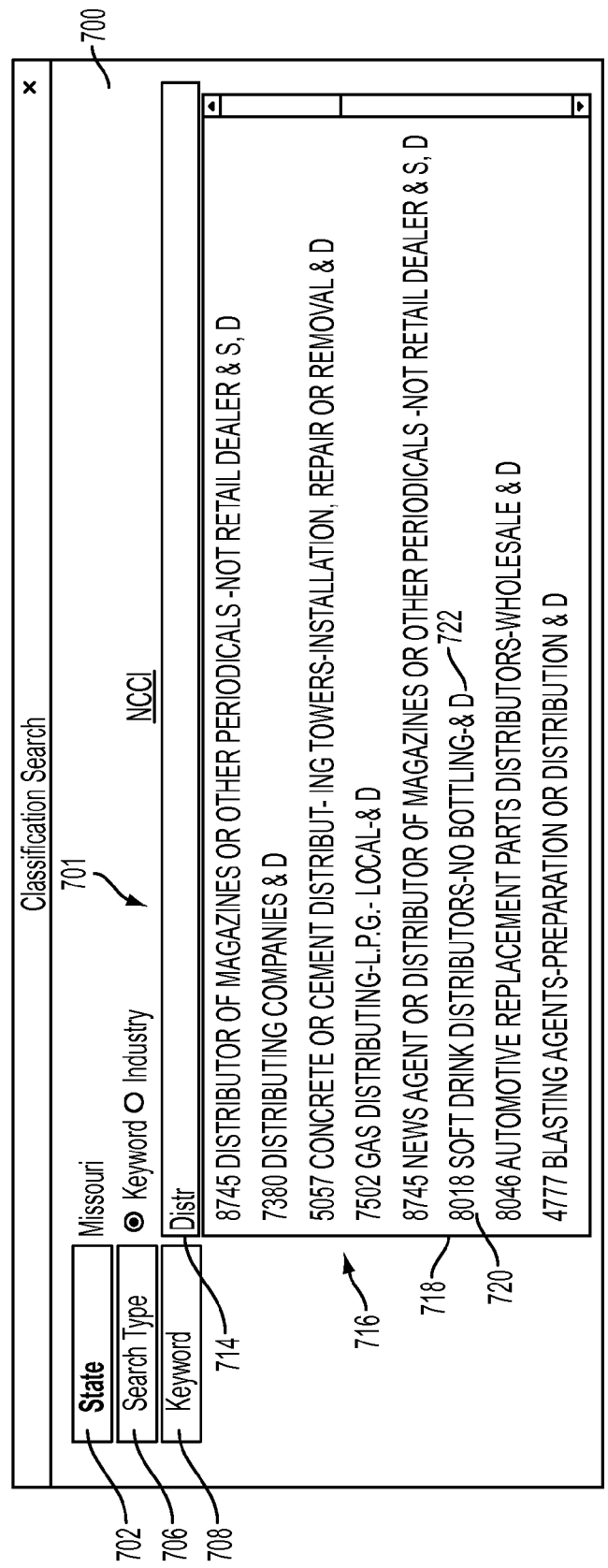
FIG. 8A depicts another example of an interactive user display and user input interface according to some embodiments of the present invention.

FIG. 8A depicts an example of the interactive user display 700 of FIG. 7A, where the geographic location indicator 702 indicates that the state of Missouri is the desired location. Similar functionality can also be realized using the interactive user display 750 of FIG. 7B. In the example of FIG. 8A, the geographic location indicator 702 is associated with geographic location-based rules 320 of FIG. 3A stored in database 111 of FIG. 1. For example, there are many numeric classification codes and corresponding descriptions defined for the state of Missouri to cover all types of work performed in the state of Missouri. The search type selection field 706 indicates that a keyword search is to be performed, and the keyword input field 708 includes a user input string 714 of "Distr" as a partial string value in this example. The user input string 714 of "Distr" can be used to form a suggestion request (i.e., a query request) in combination with the geographic location indicator 702 to retrieve a data set from a plurality of geographic location-based rules stored in the database that are considered a match, such as matching data from geographic location-based rules 320 of FIG. 3A in database 111 of FIG. 1.

As a user enters characters, the user input interface 701 of the interactive user display 700 can monitor for a minimum number of characters in the user input string 714. Once a user has entered a minimum number of characters, e.g., three or more characters, the suggestion request can be generated and sent to the query processor 116 of FIG. 1 without additional user action, i.e., the Ok button 710 of FIG. 7A need not be selected to trigger a search. In one embodiment, time between keystrokes may be used to determine when a partially formed string should be sent as the suggestion request. For example, character input of the user input string 714 can be monitored and a user pause is detected after each keystroke of the character input above the minimum number of characters. The suggestion request can be generated based on determining that the user pause is greater than a timeout period.

The query processor 116 of FIG. 1 can determine a partial match or a synonym match of the user input string 714 and retrieve a corresponding data set from the database 111 of FIG. 1. The query processor 116 of FIG. 1 may also perform filtering of the data set, for example, using the effective date 312 and expiration date 314 of FIGS. 3A and 3B to ensure that the data set will be valid for a target date, e.g., the current date or a future date as specified in the effective date 402 and/or the expiration date 404 of FIG. 4. The data set received from the query processor 116 of FIG. 1 may be formatted as a list 716 including one or more entries 718. Each of the entries 718 includes a numeric classification code 720 and a corresponding description 722. The list 716 is output on the interactive user display 700 as one or more user selectable instances of the one or more entries 718. The list 716 may be formatted in a sorted order such that entries 718 that were scored as closer matches to the suggestion request are presented at a higher position in the list 716. Upon a selection of one of the entries 718, a corresponding classification record, such as classification record 526 of FIG. 5 that is active for editing in FIG. 6, is populated with a selected instance of the numeric classification code 720 and corresponding description 722. Therefore, the numeric classification code 606 of FIG. 6 may be set to the numeric classification code 720 and the description 608 of FIG. 6 may be set to the description 722.

Figure 8B:
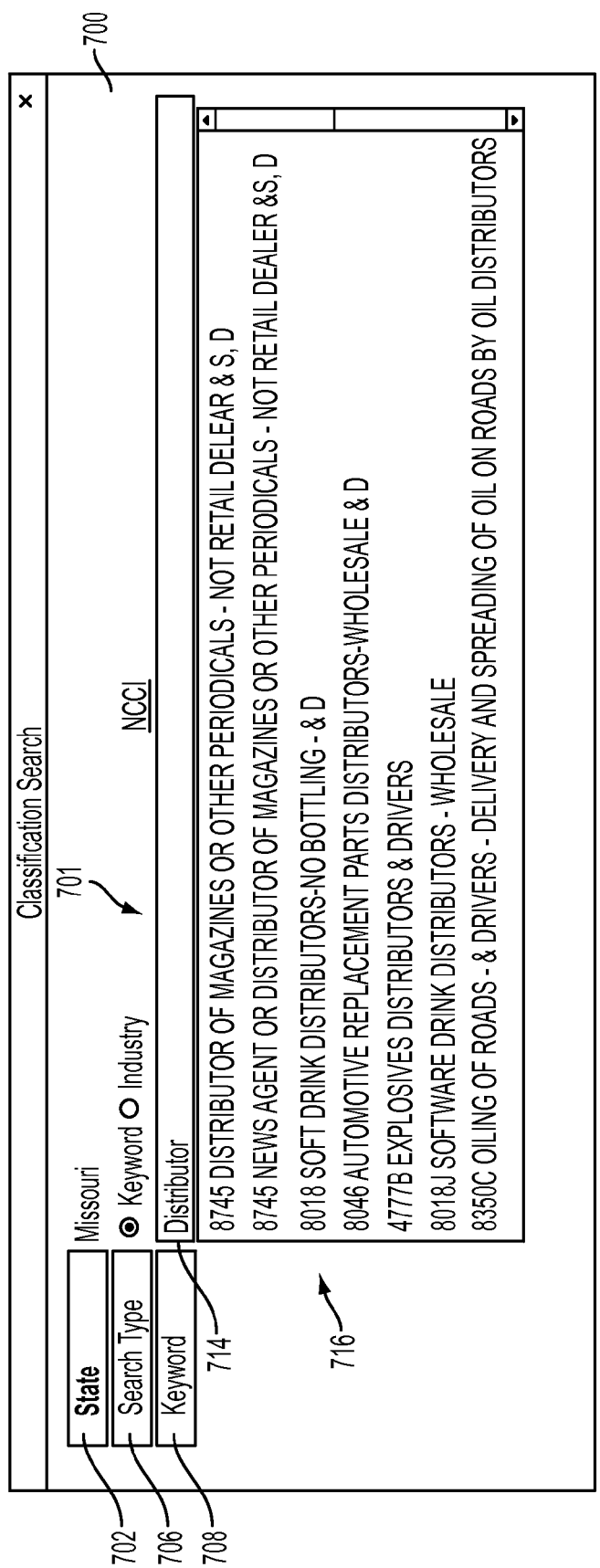
FIG. 8B depicts another example of an interactive user display and user input interface according to some embodiments of the present invention.

FIG. 8B extends the example of FIG. 8A, where the user input string 714 is further refined from "Distr" of FIG. 8A to "Distributor" in FIG. 8B. Accordingly, the list 716 of FIG. 8A is further refined in FIG. 8B. Previously matching values, such as "DISTRIBUTING" and "DISTRIBUTION" are removed and other values may become visible at a higher position in the list 716 of FIG. 8B. Again, with each change to the user input string 714, a new suggestion request can be automatically sent to the query processor 116 of FIG. 1, with updated results displayed in the list 716.

Figure 9:
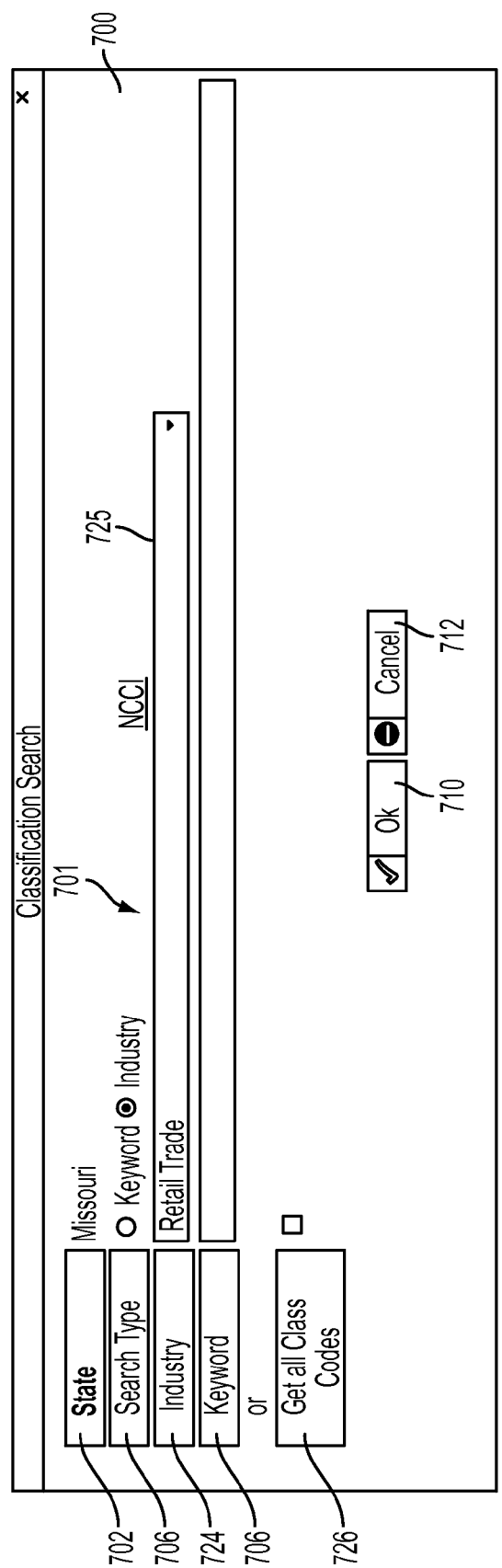
FIG. 9 depicts another example of an interactive user display and user input interface according to some embodiments of the present invention.

FIG. 9 depicts an example of the interactive user display 700, where the search type selection field 706 indicates that an industry search is to be performed. The user input interface 701 includes a field for inputting a desired industry code 724, which may be selectable from a list of industries 725. The desired industry code 724 may appear as a text-based name value but may be incorporated along with the geographic location indicator 702 in a suggestion request as an abbreviated or coded value that aligns with formatting of the industry code 310 of FIG. 3A. The desired industry code 724 can be used as a data set filter to limit a list of results displayed. An option may be provided to get all class codes 726 that include the desired industry code 724, or a keyword search can be performed in combination with the industry search to further limit the results.

FIG. 10 depicts an example of the interactive user display 700, where the search type selection field 706 indicates that an industry search is to be performed and to get all class codes 726 that match the geographic location indicator 702 and the desired industry code 724 to generate the list 716. In this example, the list 716 may include a large number of entries 718. Similar to FIG. 8A, each of the entries 718 includes a numeric classification code 720 and a corresponding description 722. As can be seen in the example of FIG. 10, a number of different descriptions can be assigned to the same numeric classification code. For example, a numeric classification code of "8017" can map to a corresponding description of "ale dealer-retail", "auctioneers", "beer dealer-retail", "beer or ale dealer-retail", etc. Other numeric classification codes may have only a single corresponding description. Accordingly, by providing both keyword searching to narrowly search for terms and also providing entire lists per industry, the multiple searching options can enable a user to quickly identify desired data regardless of the level of preexisting knowledge of classification coding for numerous geographic locations.

Figure 11A:
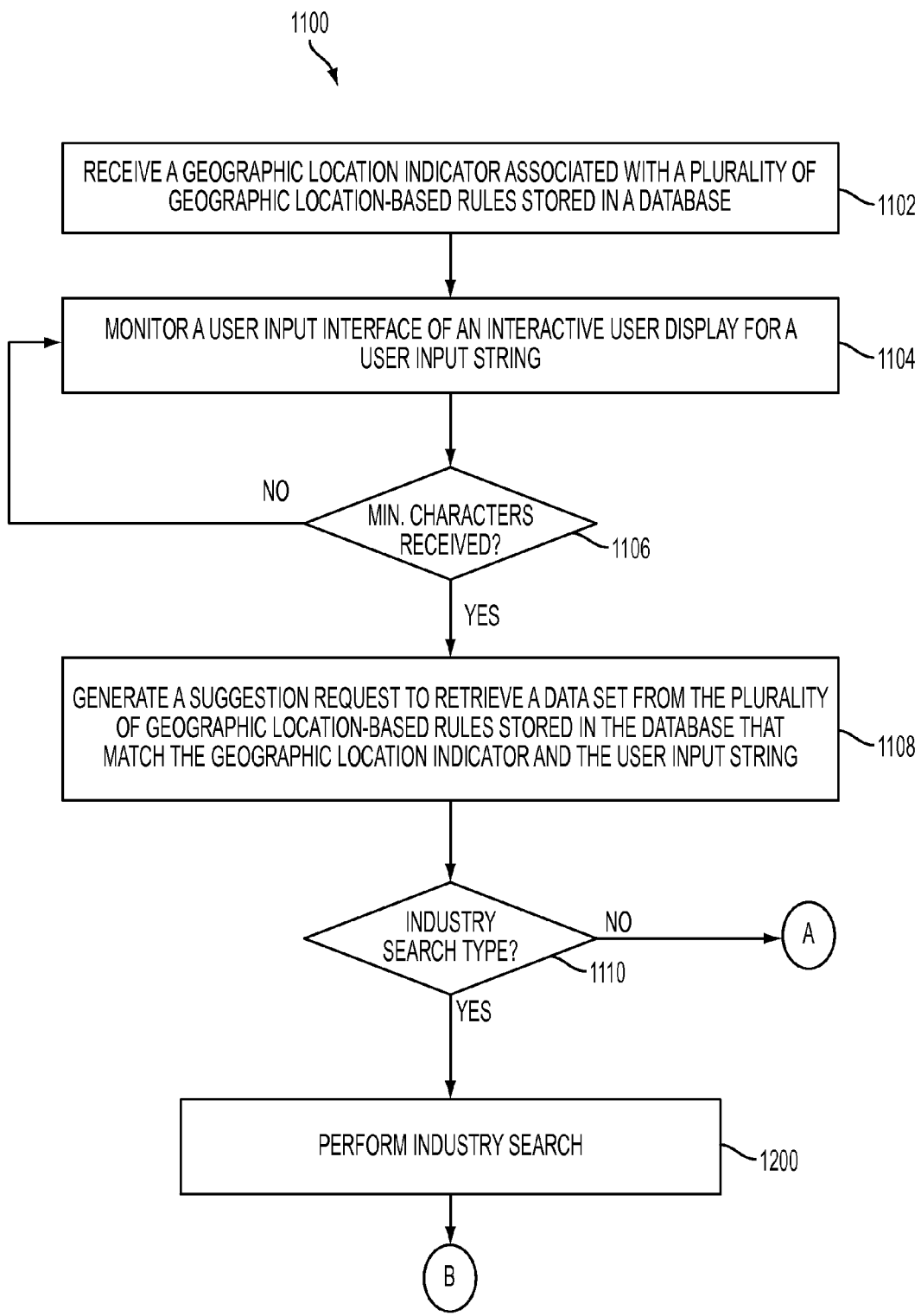
FIGS. 11A and 11B depict a process flow according to some embodiments of the present invention.
Figure 11B:
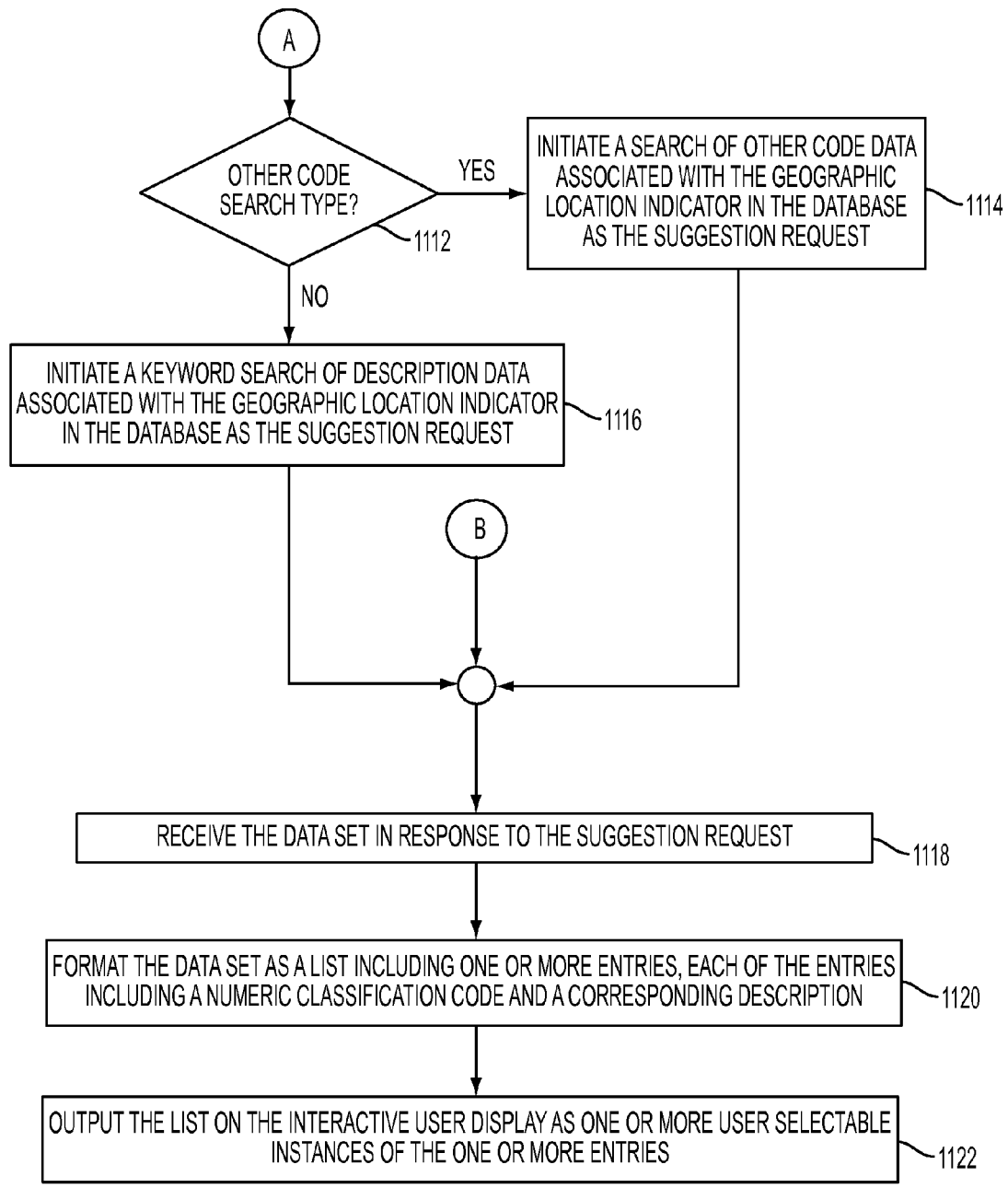

Turning now to FIGS. 11A and 11B, a process flow 1100 is depicted according to an embodiment. The process flow 1100 includes a number of steps that may be performed in the depicted sequence or in an alternate sequence. The process flow 1100 may be performed by the system 100 of FIG. 1. In one embodiment, the process flow 1100 is performed by the application server 102 of FIG. 1. In another embodiment, the process flow 1100 is performed by the user system 106 of FIG. 1.

At step 1102, a geographic location indicator is received, where the geographic location indicator is associated with a plurality of geographic location-based rules stored in a database. The geographic location indicator may be the geographic location indicator 702 of FIGS. 7A-10 received from a classification code interface, such as the editor portion 600 of the interactive user display 500 of FIG. 6 and/or the insured information 408 of FIG. 4, operable to create a plurality of classification records 526 of FIGS. 5 and 6 in preparation of an insurance policy, for example. The geographic location-based rules may be the geographic location-based rules 320 of FIG. 3A stored in database 111 of FIG. 1. The geographic location indicator 702 may be displayed on the interactive user display 700 of FIGS. 7A-10.

At step 1104, a user input interface of an interactive user display is monitored for a user input string. As depicted in the example of FIG. 7A, the user input string 714 may be for a keyword input field 708 of the user input interface 701 of the interactive user display 700. Alternatively, the user input string can be for the desired industry code 724 of FIGS. 9 and 10. As a further alternative, the user input string can be the user input string 714 of FIG. 7B for other code search types 754, such as a SIC code search 756, a NAIC code search 758, or a class code search 760 of FIG. 7B.

At step 1106, it is determined whether the user input string includes at least a minimum number of characters. For example, step 1106 may determine whether the user input string 714 of FIG. 8A includes at least three characters. A larger number of minimum characters can increase search result accuracy, as the resulting pool of potential matching results is reduced. If the minimum number of characters is not yet received, the process flow 1100 returns to step 1104; otherwise, the process flow 1100 advances to step 1108.

Prior to advancing to step 1108, further monitoring of the user input interface 701 of the interactive user display 700 of FIG. 8A may be performed to detect pauses between character input of the user input string 714. The process flow 1100 may advance to step 1108 based on determining that a duration of a user pause after a keystroke is greater than a timeout period.

At step 1108, a suggestion request is generated to retrieve a data set from the geographic location-based rules stored in the database that match the geographic location indicator and the user input string. A suggestion request may be a query string formatted for interpretation by the query processor 116 of FIG. 1 to retrieve one or more records as a data set from the geographic location-based rules 320 of FIG. 3A stored in the database 111 of FIG. 1. The suggestion request may include the geographic location indicator 702 of FIGS. 7A-10 and the user input string 714 of FIG. 8A. The geographic location indicator, as part of the suggestion request, can be provided using a reduced size code corresponding to a regulatory jurisdiction, such that it aligns in formatting with the location code 308 of FIG. 3A.

At step 1110, it is determined whether a search type to be performed is an industry search. For example, the search type selection field 706 of FIGS. 7A-10 may include a search type indicator for a keyword search or an industry search. If the search type is an industry search, the process flow 1100 advances to step 1200 as further described in reference to FIG. 12. Otherwise, the process flow 1100 advances to step 1112 of FIG. 11B.

At step 1112, it is determined whether the search type to be performed is an other code search type, such as the other code search types 754 of FIG. 7B including a SIC code search 756, a NAIC code search 758, or a class code search 760. If the search type is one of the other code search types 754 of FIG. 7B, a search of other code data associated with the geographic location indicator in the database is initiated as the suggestion request at step 1114. For example, the SIC code search 756 can result in a search of the SIC code 354 of FIG. 3B, the NAIC code search 758 can result in a search of the NAIC code 356 of FIG. 3B, and the class code search 760 can result in a search of the class code 304 of FIG. 3B. If the search type is not one of the other code search types 754 of FIG. 7B at step 1112, then the process flow 1100 advances to step 1116.

At step 1116, a keyword search is initiated of description data associated with the geographic location indicator in the database as the suggestion request. An exact or synonym match may be attempted by the query processor 116 of FIG. 1 of the user input string 714 of FIG. 8A and the description 316 of FIG. 3A to also locate the corresponding class code 304 of FIG. 3A in the database 111 of FIG. 1.

Upon completion of step 1114, step 1116, or step 1200, the process flow 1100 advances to step 1118 as depicted on FIG. 11B. At step 1118, a data set is received in response to the suggestion request. The query processor 116 of FIG. 1 may send results of the suggestion request back through the mediation layer gateway 104 of FIG. 1 as a data set.

At step 1120, the data set is formatted as a list including one or more entries, such as list 716 of entries 718 of FIGS. 8A and 10. Each of the entries 718 can include a numeric classification code 720 and a corresponding description 722. As previously described, various filters can be used to check and adjust the data set. For example, the data set can be filtered by the effective date 312 and/or the expiration date 314 of FIG. 3A. In an exemplary embodiment, the suggestion request is also based on one or more of the effective date 402 and the expiration date 404 of FIG. 4. By including either or both of the effective date 402 and the expiration date 404 of FIG. 4 in the suggestion request, filtering of data with respect to the effective date 312 and/or the expiration date 314 of FIG. 3A can be performed by the query processor 116 of FIG. 1 to further select and limit the data returned, particularly where values in the database 111 of FIG. 1 change over time. In one embodiment, only the effective date 402 of FIG. 4 is sent in the suggestion request and the effective date 402 is range checked against the effective date 312 and the expiration date 314 of FIG. 3A to ensure that only valid entries are returned with respect to date values.

At step 1122, the list is output on the interactive user display as one or more user selectable instances of the one or more entries, such as list 716 on interactive user display 700 of FIGS. 8A and 10. The list 716 may be formatted in a sorted order such that entries 718 including closer matches to the suggestion request are presented at a higher position in the list 716. The process flow 1100 may be repeated in whole or in part to perform additional searches. For example, if a user desires to change the search criteria and search again, the process flow 1100 can return to step 1104. Once a numeric classification code 720 and a corresponding description 722 are selected, they can be provided to populate the numeric classification code 606 and the description 608 of FIG. 6 upon selecting the Ok button 710 of FIGS. 7A and 9. The geographic location indicator 702 of FIGS. 7A-10 may define a regulatory jurisdiction for workers compensation insurance coverage, and the numeric classification code 720 and the corresponding description 722 of each of the entries 718 of FIGS. 8A and 10 can define classifications for workers compensation insurance according to predefined rules of the regulatory jurisdiction.

Figure 12:
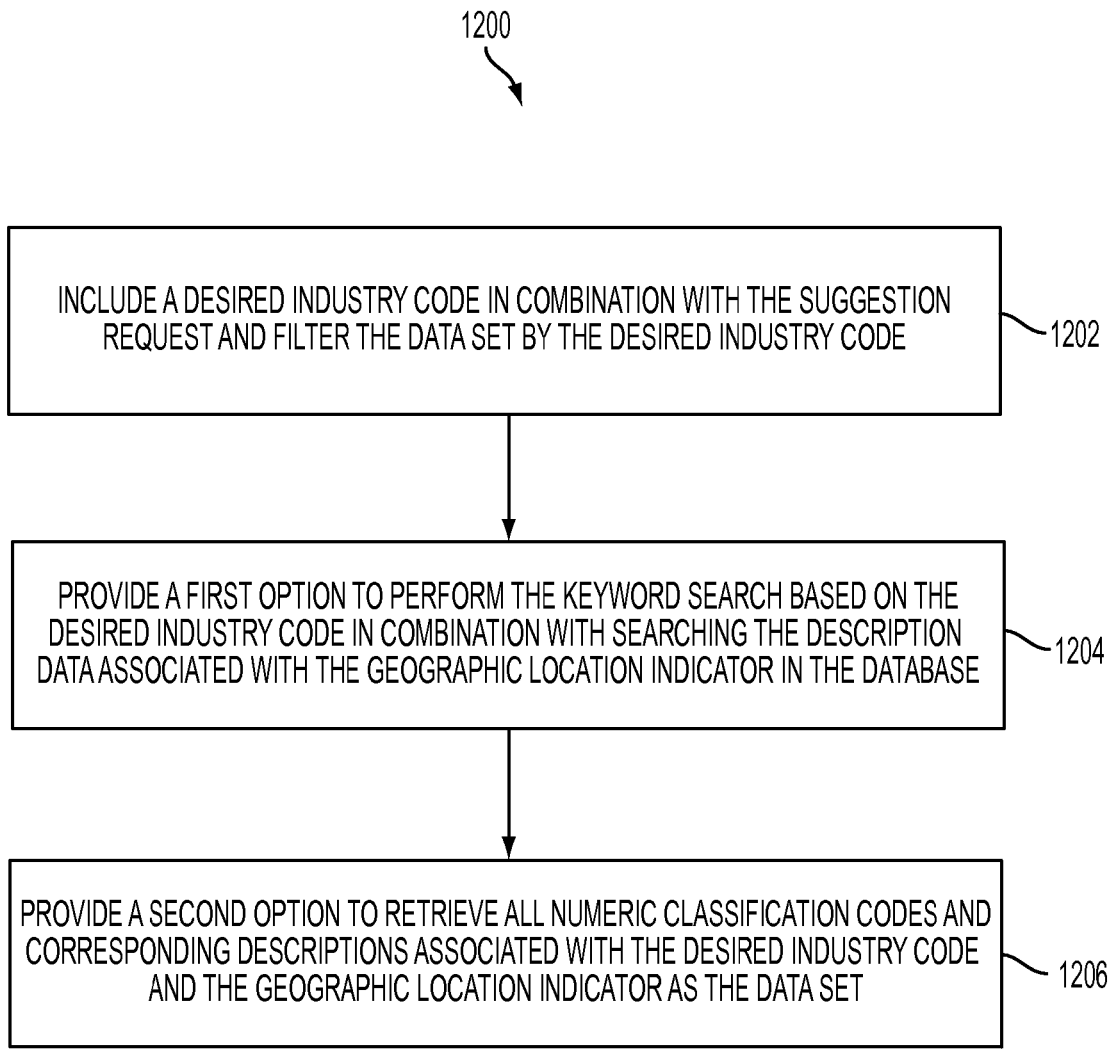
FIG. 12 depicts another process flow according to some embodiments of the present invention.

FIG. 12 depicts an industry search process flow 1200 according to an embodiment. The process flow 1200 may be triggered by step 1110 of FIG. 11A and return to step 1118 of FIG. 11B. At step 1202, a desired industry code is included in combination with the suggestion request based on determining that the requested search type is an industry search, such that the data set to be returned is filtered by the desired industry code. For example, the desired industry code 724 can be selected from a list of industries 725 based on determining that the requested search type of the search type selection field 706 is the industry search in FIGS. 9 and 10. The list of industries 725 can be mapped to industry codes 310 of FIG. 3A. The desired industry code 724 can be set from the industry codes 310 based on identifying a selection from the list of industries 725.

At step 1204, a first option to perform a keyword search is provided based on the desired industry code 724 of in combination with searching description 316 of FIG. 3A data associated with the geographic location indicator 702 in the database 111 of FIG. 1. At step 1206, a second option is provided to retrieve all numeric classification codes 720 and corresponding descriptions 722 associated with the desired industry code 724 and the geographic location indicator 702 as the data set, for instance, by selecting get all class codes 726. The process flow 1200 returns to process flow 1100 of FIGS. 11A and 11B.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
  a processing device; and
  a memory device in communication with the processing device, the memory device storing instructions that when executed by the processing device result in:
    receiving a geographic location indicator associated with a plurality of geographic location-based rules stored in a database;
    monitoring a user input interface of an interactive user display for a user input string comprising a minimum number of characters;
    generating a suggestion request to retrieve a data set from the plurality of geographic location-based rules stored in the database that match the geographic location indicator and the user input string based on determining that the user input string includes at least the minimum number of characters, the geographic location-based rules constraining a plurality of numeric classification codes and corresponding descriptions based on the geographic location indicator, and a same numeric classification code having a different corresponding description defined by the geographic location-based rules;

receiving the data set in response to the suggestion request;

formatting the data set as a list comprising one or more entries, each of the entries comprising one of the numeric classification codes and one of the corresponding descriptions based on the geographic location indicator; and outputting the list on the interactive user display as one or more user selectable instances of the one or more entries.

2. The system of claim 1, further comprising instructions that when executed by the processing device result in:
determining a requested search type; and
initiating a keyword search of description data associated with the geographic location indicator in the database as the suggestion request based on determining that the requested search type is a keyword search.

3. The system of claim 2, further comprising instructions that when executed by the processing device result in:
including a desired industry code in combination with the suggestion request based on determining that the requested search type is an industry search, wherein the data set is filtered by the desired industry code.

4. The system of claim 3, further comprising instructions that when executed by the processing device result in:
providing a first option to perform the keyword search based on the desired industry code in combination with searching the description data associated with the geographic location indicator in the database; and
providing a second option to retrieve all of the numeric classification codes and the corresponding descriptions associated with the desired industry code and the geographic location indicator as the data set.

5. The system of claim 3, further comprising instructions that when executed by the processing device result in:
providing a list of industries based on determining that the requested search type is the industry search;
mapping the list of industries to industry codes; and
setting the desired industry code from the industry codes based on identifying a selection from the list of industries.

6. The system of claim 1, further comprising instructions that when executed by the processing device result in:
monitoring the user input interface of the interactive user display for character input of the user input string;
detecting a user pause after each keystroke of the character input above the minimum number of characters; and
generating the suggestion request based on determining that the user pause is greater than a timeout period.

7. The system of claim 1, wherein the data set received in response to the suggestion request further comprises a synonym match of the user input string.

8. The system of claim 1, wherein the suggestion request is further based on one or more of an effective date and an expiration date, and the data set received in response to the suggestion request is filtered by one or more of the effective date and the expiration date.

9. The system of claim 1, wherein the list is formatted in a sorted order such that entries comprising closer matches to the suggestion request are presented at a higher position in the list.

10. The system of claim 1, further comprising instructions that when executed by the processing device result in:
providing a hyperlink on the interactive user display to a remote data source comprising additional information associated with the numeric classification codes and the corresponding descriptions for the geographic location indicator.

11. The system of claim 1, wherein the geographic location indicator defines a regulatory jurisdiction for workers compensation insurance coverage, and the one of the numeric classification codes and the one of the corresponding descriptions of each of the entries define classifications for workers compensation insurance according to predefined rules of the regulatory jurisdiction.

12. The system of claim 11, further comprising instructions that when executed by the processing device result in:
displaying the geographic location indicator on the interactive user display; and
providing the geographic location indicator as part of the suggestion request using a reduced size code corresponding to the regulatory jurisdiction.

13. The system of claim 1, further comprising instructions that when executed by the processing device result in:
receiving the geographic location indicator from a classification code interface operable to create a plurality of classification records in preparation of an insurance policy;
detecting a selection of one of the one or more entries in the list; and
populating one of the classification records of the classification code interface that is active for editing with a selected instance of the numeric classification codes and the corresponding descriptions.

14. The system of claim 1, wherein the database is periodically updated and indexed by an automated process.

15. The system of claim 1, wherein the interactive user display is generated by an application server coupled to a mediation layer gateway, and the data set received in response to the suggestion request is retrieved from the database by a query processor and passed through the mediation layer gateway.

16. The system of claim 1, further comprising instructions that when executed by the processing device result in:
determining a requested search type; and
initiating a search of corresponding data associated with the geographic location indicator in the database as the suggestion request based on the requested search type.

17. The system of claim 16, wherein the requested search type is one of: a standard industry classification (SIC) code search, a national association of insurance commissioners (NAIC) code search, or a numeric classification code search.

18. A computer program product comprising a storage medium embodied with computer program instructions that when executed by a computer cause the computer to implement:
receiving a geographic location indicator associated with a plurality of geographic location-based rules stored in a database;
monitoring a user input interface of an interactive user display for a user input string comprising a minimum number of characters;
generating a suggestion request to retrieve a data set from the plurality of geographic location-based rules stored in the database that match the geographic location indicator and the user input string based on determining that the user input string includes at least the minimum number of characters, the geographic location-based rules constraining a plurality of numeric classification codes and corresponding descriptions based on the geographic location indicator, and a same numeric classification code having a different corresponding description defined by the geographic location-based rules;

receiving the data set in response to the suggestion request;

formatting the data set as a list comprising one or more entries, each of the entries comprising one of the numeric classification codes and one of the corresponding descriptions based on the geographic location indicator; and outputting the list on the interactive user display as one or more user selectable instances of the one or more entries.

19. The computer program product of claim 18, further comprising computer program instructions that when executed by the computer cause the computer to implement:
determining a requested search type; and
initiating a keyword search of description data associated with the geographic location indicator in the database as the suggestion request based on determining that the requested search type is a keyword search.

20. The computer program product of claim 19, further comprising computer program instructions that when executed by the computer cause the computer to implement:
including a desired industry code in combination with the suggestion request based on determining that the requested search type is an industry search, wherein the data set is filtered by the desired industry code.

21. The computer program product of claim 20, further comprising computer program instructions that when executed by the computer cause the computer to implement:
providing a first option to perform the keyword search based on the desired industry code in combination with searching the description data associated with the geographic location indicator in the database; and
providing a second option to retrieve all of the numeric classification codes and corresponding descriptions associated with the desired industry code and the geographic location indicator as the data set.

22. The computer program product of claim 20, further comprising computer program instructions that when executed by the computer cause the computer to implement:
providing a list of industries based on determining that the requested search type is the industry search;
mapping the list of industries to industry codes; and
setting the desired industry code from the industry codes based on identifying a selection from the list of industries.

23. The computer program product of claim 18, further comprising computer program instructions that when executed by the computer cause the computer to implement:
monitoring the user input interface of the interactive user display for character input of the user input string;
detecting a user pause after each keystroke of the character input above the minimum number of characters; and
generating the suggestion request based on determining that the user pause is greater than a timeout period.

24. The computer program product of claim 18, wherein the data set received in response to the suggestion request further comprises a synonym match of the user input string.

25. The computer program product of claim 18, wherein the suggestion request is further based on one or more of an effective date and an expiration date, and the data set received in response to the suggestion request is filtered by one or more of the effective date and the expiration date.

26. The computer program product of claim 18, wherein the list is formatted in a sorted order such that entries comprising closer matches to the suggestion request are presented at a higher position in the list.

27. The computer program product of claim 18, further comprising computer program instructions that when executed by the computer cause the computer to implement:
providing a hyperlink on the interactive user display to a remote data source comprising additional information associated with the numeric classification codes and the corresponding descriptions for the geographic location indicator.

28. The computer program product of claim 18, wherein the geographic location indicator defines a regulatory jurisdiction for workers compensation insurance coverage, and the one of the numeric classification codes and the one of the corresponding descriptions of each of the entries define classifications for workers compensation insurance according to predefined rules of the regulatory jurisdiction.

29. The computer program product of claim 28, wherein the computer program instructions executed by the computer further cause the computer to implement:
displaying the geographic location indicator on the interactive user display; and
providing the geographic location indicator as part of the suggestion request using a reduced size code corresponding to the regulatory jurisdiction.

30. The computer program product of claim 18, wherein the computer program instructions executed by the computer further cause the computer to implement:
receiving the geographic location indicator from a classification code interface operable to create a plurality of classification records in preparation of an insurance policy;
detecting a selection of one of the one or more entries in the list; and
populating one of the classification records of the classification code interface that is active for editing with a selected instance of the numeric classification codes and the corresponding descriptions.

31. The computer program product of claim 18, further comprising computer program instructions that when executed by the computer cause the computer to implement:
determining a requested search type; and
initiating a search of corresponding data associated with the geographic location indicator in the database as the suggestion request based on the requested search type.

32. The computer program product of claim 31, wherein the requested search type is one of: a standard industry classification (SIC) code search, a national association of insurance commissioners (NAIC) code search, or a numeric classification code search.

* * * * *